US011585387B2

(12) United States Patent
Fish

(10) Patent No.: US 11,585,387 B2
(45) Date of Patent: Feb. 21, 2023

(54) ROTOR DRIVE KEY ASSEMBLY

(71) Applicant: Honeywell International Inc., Morris Plains, NJ (US)

(72) Inventor: Bradley E. Fish, Elkhart, IN (US)

(73) Assignee: Honeywell International Inc., Charlotte, NC (US)

(*) Notice: Subject to any disclaimer, the term of this patent is extended or adjusted under 35 U.S.C. 154(b) by 390 days.

(21) Appl. No.: 16/799,392

(22) Filed: Feb. 24, 2020

(65) Prior Publication Data

US 2021/0262526 A1  Aug. 26, 2021

(51) Int. Cl.
| | | |
|---|---|---|
| *B64C 25/44* | (2006.01) | |
| *F16D 55/36* | (2006.01) | |
| *F16D 3/06* | (2006.01) | |
| *F16D 65/12* | (2006.01) | |
| *B64C 25/36* | (2006.01) | |
| *F16D 65/02* | (2006.01) | |

(52) U.S. Cl.
CPC ............... *F16D 3/06* (2013.01); *F16D 55/36* (2013.01); *F16D 65/123* (2013.01); *B64C 25/36* (2013.01); *B64C 25/44* (2013.01); *F16D 2065/1364* (2013.01); *F16D 2065/1392* (2013.01)

(58) Field of Classification Search
CPC .......... F16D 3/06; F16D 55/36; F16D 65/128; B64C 25/44
USPC ................ 188/71.5, 71.6; 301/6.1, 6.2, 6.91
See application file for complete search history.

(56) References Cited

U.S. PATENT DOCUMENTS

| | | | |
|---|---|---|---|
| 2,835,355 | A | 5/1958 | Armstrong |
| 3,345,109 | A | 10/1967 | Petersen et al. |
| 3,829,162 | A | 8/1974 | Stimson et al. |
| 4,018,482 | A | 4/1977 | Rastogi et al. |
| 4,084,857 | A | 4/1978 | VanderVeen |
| 4,890,700 | A | 1/1990 | Guichard |
| 5,186,521 | A | 2/1993 | Niespodziany et al. |
| 6,003,954 | A | 12/1999 | Everhard et al. |
| 7,390,067 | B2 | 6/2008 | Tong et al. |
| 7,766,133 | B2 | 8/2010 | Cress |
| 7,802,758 | B2 | 9/2010 | Cress et al. |
| 8,844,701 | B2 | 9/2014 | Pardee |
| 9,193,448 | B2 | 11/2015 | Crescenzo et al. |
| 9,919,794 | B2 | 3/2018 | Rook |

(Continued)

FOREIGN PATENT DOCUMENTS

| | | |
|---|---|---|
| CN | 103523216 B | 2/2016 |
| EP | 3763962 A1 | 1/2021 |

OTHER PUBLICATIONS

Extended Search Report from counterpart European Application No. 21155869.7, dated Jun. 14, 2021, 7 pp.

(Continued)

*Primary Examiner* — Christopher P Schwartz
(74) *Attorney, Agent, or Firm* — Shumaker & Sieffert, P.A.

(57) ABSTRACT

In some examples, an assembly includes a rotor drive key configured to be positioned over a wheel boss defined by a wheel. A drive key body defines a trough configured to receive the wheel boss. An inner surface of the drive key body is configured to establish a conforming contact with an outer profile of the wheel boss and oppose relative motion of the rotor drive key in a radial direction of the wheel. The rotor drive key includes a tab having a tab aperture configured to receive a fastener extending in an axial direction of the wheel and engaging the wheel boss.

20 Claims, 9 Drawing Sheets

(56) References Cited

U.S. PATENT DOCUMENTS

| | | | |
|---|---|---|---|
| 10,066,690 B2 | 9/2018 | Pahle et al. | |
| 11,092,203 B2* | 8/2021 | Steele | F16D 65/0006 |
| 11,242,138 B2* | 2/2022 | Beehler | F16B 3/00 |
| 2019/0331178 A1* | 10/2019 | Steele | C23C 24/103 |
| 2021/0010549 A1* | 1/2021 | Fish | F16D 55/36 |
| 2021/0317880 A1* | 10/2021 | Fish | F16D 3/06 |

OTHER PUBLICATIONS

Response to Extended Search Report dated Jun. 14, 2021, from counterpart European Application No. 21155869.7, filed Jun. 15, 2021, 41 pp.

"Aircraft Wheels—Aircraft Landing Gear Systems," Aeronautics Guide, accessed from https://www.aircraftsystemstech.com/p/aircraft-wheels-aircraft-wheels-are.html, accessed on Aug. 1, 2019, 12 pp.

Communication pursuant to Article 94(3) EPC from counterpart European Application No. 21155869.7 dated Nov. 24, 2021, 4 pp.

Response to Communication pursuant to Article 94(3) EPC dated Nov. 24, 2021, from counterpart European Application No. 21155869.7 filed Nov. 29, 2021, 3pp.

Notice of Intent to Grant and Text Intended to Grant from counterpart European Application No. 21155869.7 dated Apr. 8, 2022, 46 pp.

\* cited by examiner

ROTOR DRIVE KEY ASSEMBLY

TECHNICAL FIELD

The present disclosure relates to wheel brake systems of vehicles.

BACKGROUND

Vehicles, such as aircrafts, may use a wheel brake system that includes a multi-disc brake assembly. For example, the multi-disc brake assembly may include a plurality of rotors engaged with a wheel and a plurality of stators interleaved with the rotors. The rotors and wheel are configured to rotate around an axle, while the stators remain stationary. To decelerate rotational motion of a rotating wheel, the brake assembly may displace pistons against a pressure plate to squeeze the rotating rotors engaged with the wheel against the stationary stators, therefore producing torque that decelerates the rotational motion of the wheel. In some examples, the rotors may be engaged with the wheel via rotor drive keys positioned on an interior surface of the wheel. In some such examples, the rotors may define slots configured to receive the rotor drive keys.

SUMMARY

In some examples, an assembly includes a rotor drive key configured to be positioned over a wheel boss defined by a wheel. The rotor drive key includes a drive key body defining a trough configured to receive the wheel boss. An inner surface of the drive key body defining the trough is configured to dovetail with wheel boss and establish a conforming contact with an outer profile of the wheel boss to help limit movement of the rotor drive key relative to the wheel boss. In some examples, the drive key body defines a substantially U-shaped cross-section configured to at least partially surround a wheel boss when the rotor drive key dovetails with the wheel boss, such that the rotor drive key is substantially secured against movement in a tangential direction of the wheel. The inner surface of the drive key body is configured to slide over the outer profile of the wheel boss in an axial direction of the wheel boss and oppose relative motion of the rotor drive key in a radial direction of the wheel.

The conforming contact between the drive key body and the wheel boss can be established by the inner surface of the drive key body using any suitable structure. For example, in some examples, the inner surface defines a recess configured to receive a wheel boss protrusion and/or a protrusion configured to insert into a wheel boss recess.

In some examples, the rotor drive key includes a tab defining a tab aperture configured to receive a fastener extending in an axial direction of the wheel. The fastener may engage the wheel boss to limit motion (e.g., prevent or substantially prevent motion) of the rotor drive key relative to the wheel in an axial direction of the wheel.

An example method of attaching the rotor drive key to an interior surface of a wheel is additionally described herein.

The details of one or more examples are set forth in the accompanying drawings and the description below. Other features, objects, and advantages will be apparent from the description and drawings, and from the claims.

DETAILED DESCRIPTION

Figure 1:
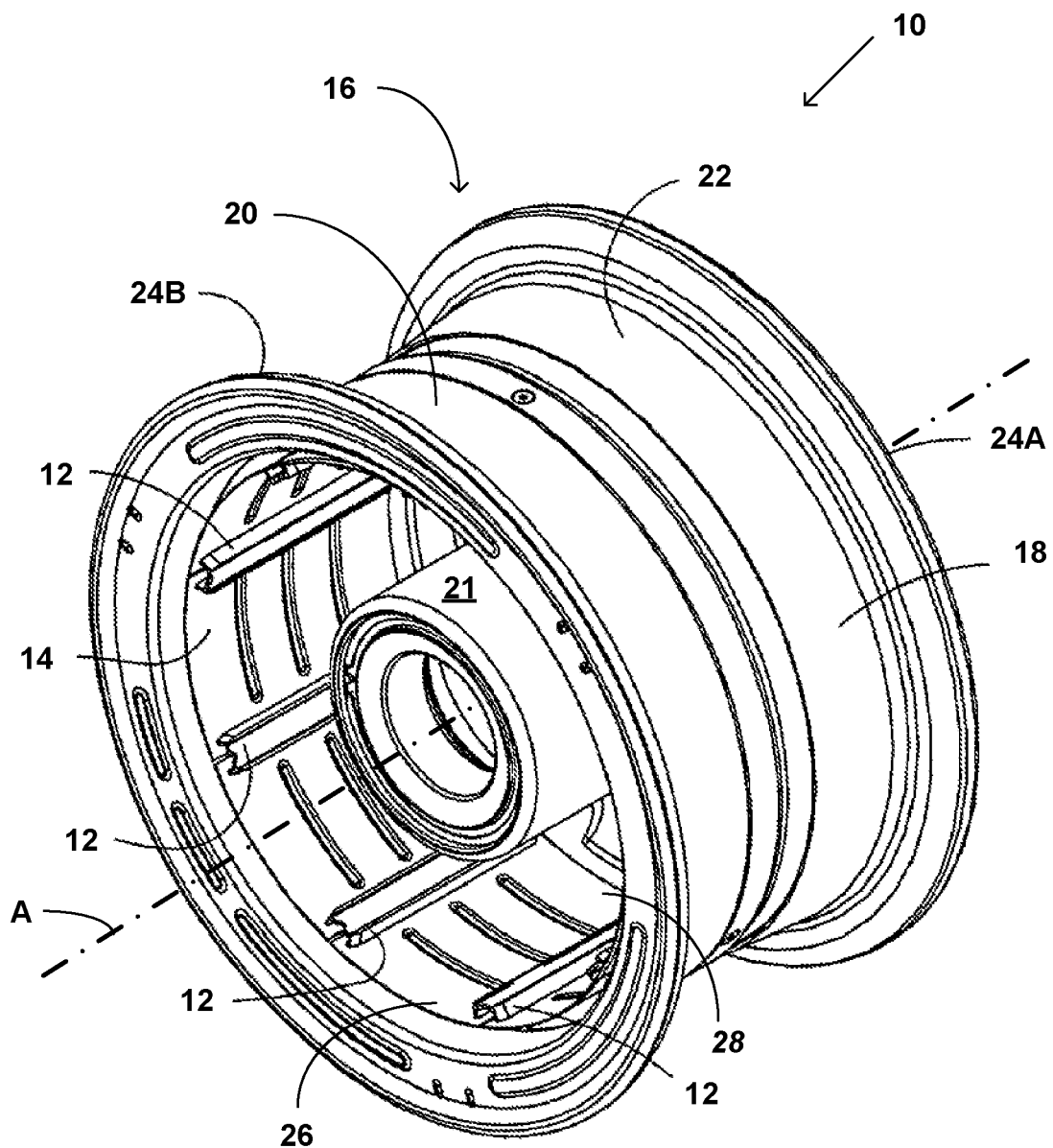
FIG. 1 is a perspective view of an example wheel including a plurality of rotor drive keys on an interior surface of the wheel.

The disclosure describes articles, systems, and techniques relating to rotor drive keys of a wheel brake system of a vehicle, and assemblies for connecting a rotor drive key to a vehicle wheel. The rotor drive keys described herein are configured to be attached to an interior surface of a wheel. The interior surface of the wheel defines at least one wheel boss, and the rotor drive key is configured to be positioned over the wheel boss. The wheel boss may extend in a substantially radial direction (e.g., radial or nearly radial to the extent permitted by manufacturing tolerances) of the wheel, and the rotor drive key may extend in a substantially axial direction (e.g., axial or nearly axial to the extent permitted by manufacturing tolerances) of the wheel when positioned over the wheel boss.

The rotor drive key includes a drive key body defining a trough ("drive key trough") configured to receive one or more wheel bosses of the wheel. The trough is defined at least in part by an inner surface of the drive key body, and the inner surface is configured to conform with a portion of an outer profile of the wheel boss when the trough receives the wheel boss. In some examples, the drive key trough may be defined by a key base section, a key first side, and a key second side of the drive key body, with the key first side and the key second side extending from the key base section, and the key second side separated from the key first side at least by the key base section. The rotor drive key is configured to slide axially over the one or more wheel bosses and substantially dovetail with a protrusion, recess, or protrusion and recess of at least one wheel boss of the one or more wheel bosses, in order to substantially secure the rotor drive key against relative movement in a radial direction of the wheel.

As used herein, "relative movement" of a rotor drive key means movement relative to the wheel when the rotor drive key is positioned on the wheel. Hence, the rotor drive key may experience substantially zero relative motion in the radial, tangential, and/or axial directions as the wheel and rotor drive key together experience a motion (e.g., radial, tangential, and/or axial motion) measured with reference to a point removed from the wheel and the rotor drive key.

In some examples, the drive key trough of the rotor drive key may have a substantially U-shaped cross-section configured to at least partially surround one or more wheel bosses when the rotor drive key dovetails with at least one wheel boss, in order to limit (e.g., substantially prevent or prevent) relative movement of the rotor drive key in a tangential direction of the wheel. To limit (e.g., substantially prevent or prevent) relative movement of the rotor drive key in an axial direction of the wheel, a fastener can be positioned to extend axially through the rotor drive key and into a wheel boss. The fastener engages the wheel boss (e.g., threadably engages) in order to substantially secure the rotor drive key against the wheel boss during operation.

The rotor drive key is configured to be positioned over one or more wheel bosses extending radially from an interior surface of the wheel. The drive key body defining the drive key trough includes an inner surface configured to conform with (e.g., complement) one or more wheel bosses when the rotor drive key extends in an axial direction of the wheel. The inner surface of the drive key body is configured to conform to a structure of the wheel boss as the rotor drive key is translated (e.g., slidably translated) over one or more wheel bosses in an axial direction of the wheel, in order to substantially secure the rotor drive key against relative movement in a radial direction of the wheel. The inner surface of the drive key body may be configured to conform with an outer profile of a wheel boss surface substantially facing a tangential direction of the wheel. For example, the outer profile may define a wheel boss protrusion and the inner surface of the drive key body can define a recess configured to receive the wheel boss protrusion when the rotor drive key slides over the wheel boss in an axial direction of the wheel. The recess can be configured to substantially conform to (e.g., complement) the protrusion in a plane substantially perpendicular to the axial direction of the wheel (e.g., substantially parallel to a radial and tangential direction of the wheel).

As another example, in addition to or instead of a recess, the inner surface of the drive key body can define a protrusion configured to insert into a wheel boss recess when the rotor drive key slides over the wheel boss of the wheel. The outer profile of the wheel boss may define the wheel boss recess. The protrusion can be configured to substantially conform to (e.g., complement) the wheel boss recess in a plane substantially perpendicular to the axial direction. In any of these examples, the drive key body defines a conforming structure along the drive key trough configured such that, when the conforming structure conforms with a corresponding structure defined by the wheel boss, a force on the drive key body in a radial direction of the wheel causes the wheel boss to exert an opposing reaction force on the drive key body, such that the drive key body is substantially secured from relative motion in a radial direction of the wheel. In examples, the drive key body is configured such that a force on the drive key body in a tangential direction of the wheel causes the wheel boss to exert an opposing reaction force on the drive key body, substantially securing the drive key body from relative motion in a tangential direction of the wheel.

In some examples, the inner surface of the drive key body defining the drive key trough and the conforming structure is defined by a first inner surface of a first side of the drive key body ("key first side"), with the conforming structure configured to conform with a first side of a wheel boss ("boss first side"). A second side of the drive key body ("key second side") may include a second inner surface which faces the first inner surface of the key first side. The second inner surface is configured to face a second side of a wheel boss ("boss second side") when the rotor drive key extends axially on the wheel. The boss second side is displaced from the boss first side in a tangential direction of the wheel (e.g., on an opposite side of the wheel boss from the boss first side). The key second side may include a second conforming structure configured to substantially conform with a second boss structure of the boss second side. Thus, the second conforming structure of the drive key body may aid in substantially securing the rotor drive key against movement in the radial direction of the wheel. A key base section may extend between the key first side and the key second side, such that the key base section, the key first side, and the key second side define the drive key trough.

In some examples, the rotor drive key further includes a tab extending from the drive key body and configured to oppose relative motion of the rotor drive key in an axial direction of the wheel when the rotor drive key is positioned on the one or more wheel bosses. The tab can be physically separate from the drive key body and connectable to the drive key body. In other examples, the tab and the drive key body can have a unibody construction (e.g., formed from one continuous piece of material). The tab may define a tab bearing surface configured to engage a boss bearing surface of the wheel boss when the rotor drive key is positioned over the wheel boss. For example, the boss bearing surface can be between the first boss side and the second boss side described above. In some examples, the tab may be configured to establish and/or maintain mechanical connection with at least the key base section, the key first side, and the key second side of the rotor drive key, such that axial reaction forces from the boss bearing surface to the tab bearing surface, and/or from the wheel boss to the fastener, at least partially transmit to other portions of the rotor drive key and substantially secure the rotor drive against movement in the axial direction of the wheel.

The tab defines a tab aperture configured to receive a fastener in a substantially axial direction of the wheel. The fastener may be a threaded fastening bolt. The fastener is configured to extend through the tab aperture and into the boss bearing surface. The fastener may engage the wheel boss (e.g., threadably engage) to substantially maintain the tab bearing surface of the rotor drive key in a particular position relative to the boss bearing surface of the wheel boss. For example, the fastener may substantially maintain the tab bearing surface in contact with the boss bearing surface, and/or maintain the tab bearing surface in contact with one or more materials (e.g., a compression washer) between the tab bearing surface and the boss bearing surface.

When the fastener extends axially through the rotor drive key and into a wheel boss as the inner surface of the drive key body dovetails with the wheel boss, the rotor drive key may be substantially anchored against relative movements in the axial, tangential, and radial directions of the wheel. This may enable one or more bolts oriented along a radial wheel axis or perpendicular to a length of a rotor drive key to be eliminated from the assembly. Bolts oriented along a radial wheel axis or otherwise perpendicular to a length of a rotor drive key may be more difficult to install than the substantially axially extending fasteners described herein, e.g., may require a special right angle tool to install the bolt. Further, bolts oriented along a radial wheel axis or otherwise perpendicular to a length of a rotor drive key may be more likely to become unattached to an interior surface of the wheel compared to the conforming rotor drive key and axially oriented fastener described herein. For instance, heat cycling, vibration, or the like may result in the bolt becoming loose or even completely unattached to the rotor drive key and the wheel assembly. In addition, there may not be sufficient radial clearance in the wheel assembly for a nut or other retaining mechanism to be used with a bolt that extends in the radial direction. Loosening of the bolt may cause the rotor drive key to be unsecured to the wheel, which may decrease the useful life of the rotor drive key and/or wheel, and interrupt the function of the braking assembly for the wheel, increase maintenance costs, result in premature replacement of the rotor drive key, or the like.

In addition, use of fastener extending in an axial direction of the wheel may allow more options for the use of anti-rotational features, such as keys, pins and other securing and/or locking mechanisms. The use of such securing and/or locking mechanisms may be limited on radially-oriented bolts, which generally must be recessed within the envelope of the rotor drive key.

Example rotor drive keys described herein are configured to secure against an interior surface of a wheel using an inner surface (defining a drive key trough) that dovetails with one or more wheel bosses extending radially from the interior surface of the wheel. The inner surface is configured to conform with a wheel boss in a manner which substantially secures the rotor drive key against relative movement in at least a radial direction of the wheel. The drive key trough may partially surround a wheel boss when the inner surface dovetails with the wheel boss, in order to substantially secure the rotor drive key against relative movement in at least a tangential direction of the wheel. A fastener may extend through the rotor drive key and into the wheel boss to substantially secure the rotor drive key against relative movement in at least an axial direction of the wheel. Thus, radial, tangential, and axial support can be provided in a manner that may result in the fastener being less likely to loosen during operation of the wheel or braking system (e.g., due to heat cycling, vibration, or other operating conditions) in comparison to other rotor drive key assemblies that include fasteners extending in a radial direction of the wheel. Further, the first inner surface and/or second inner surface are configured to enable a translation of the rotor drive key over the wheel boss in an axial direction while substantially conforming to a side of the wheel boss in a plane perpendicular to the axial direction (e.g, parallel to the radial and tangential directions of the wheel), potentially allowing for ease of assembly and/or disassembly.

FIG. 1 is a perspective view illustrating an example wheel 10 including a plurality of rotor drive keys 12 on an interior surface 14 of wheel 10. In some examples, wheel 10 is a part of an aircraft vehicle. In other examples, wheel 10 may be a part of any other vehicle, such as, for example, any marine vessel, land vehicle, or other vehicle. Wheel 10 may include a rim 16 defining an exterior surface 18 and interior surface 14. Rim 16 may include tubewell 20, wheel hub 21, and wheel outrigger flange 22. In some examples, interior surface 14 may include an inner diameter of tubewell 20 of wheel 10. For example, in some cases, interior surface 14 may be referred to as an inner diameter surface of wheel 10.

In some examples, a tire (not shown) may be mounted on exterior surface 18 of rim 16. For example, wheel 10 may include an inboard bead seat 24B and an outboard bead seat 24A configured to retain a tire on exterior surface 18 of rim 16.

Wheel 10 is configured to engage with one or more rotors (not shown in FIG. 1) of a braking assembly. For example, as shown in the example of FIG. 1, a plurality of rotor drive keys 12 are positioned along interior surface 14, and each rotor drive key of the plurality of rotor drive keys 12 may be configured to engage with one or more rotors of a brake disc stack of a braking assembly. An example braking assembly will be described in more detail with respect to FIG. 2.

In some examples, each rotor drive key of the plurality of rotor drive keys 12 extends in a substantially axial direction of wheel 10 (e.g., in a direction parallel to the axis label "A" in FIG. 1, which can be an axis of rotation of wheel 10). For example, a length of each rotor drive key of the plurality of rotor drive keys 12 may extend in the substantially axial (e.g., axial or nearly axial to the extent permitted by manufacturing tolerances) direction of the axis A. In some such examples, the respective length of each rotor drive key 12 may extend from (or near) a first edge 26 of wheel 10 to (or close to) a second edge 28 of wheel 10. In this way, in some examples, a length of a rotor drive key 12 of the plurality of rotor drive keys 12 may be the same or substantially similar to (e.g., within 10%) a width of wheel 10 from first edge 26 to second edge 28. In other examples, a length of a rotor drive key 12 may be less than the width of wheel 10.

The plurality of rotor drive keys 12 extending in the substantially axial direction may enable wheel 10 to slide onto a braking assembly. For example, a plurality of rotors of a braking assembly may include drive slots configured to receive the plurality of rotor drive keys 12, enabling the plurality of rotor drive keys 12 to be slid into respective drive slots of the plurality of rotors. In other examples, one or more rotor drive keys of the plurality of rotor drive keys 12 may be oriented in a different direction and/or may engage with one or more rotors in a different manner.

The plurality of rotor drive keys 12 may include any suitable number of rotor drive keys. The number of drive keys may be vehicle specific and may depend on, e.g., loads, size of parts, material property, and the like. In some examples, the number of the rotor drive keys included in the plurality of rotor drive keys 12 may correspond to a number of drive slots defined by a plurality of rotors of a braking assembly configured to receive the plurality of rotor drive keys 12. For example, each rotor drive key of the plurality of rotor drive keys 12 may correspond to a respective slot defined by the plurality of rotors of a braking assembly.

As illustrated in the example of FIG. 1, in some examples, the plurality of rotor drive keys 12 may be mounted at substantially equal circumferential distances around interior surface 14 of wheel 10. In other examples, one or more of the plurality of rotor drive keys 12 may be mounted a different circumferential distance from an adjacent rotor drive than at least one other rotor drive key. Here and elsewhere, circumferential distance means the length of an arc (e.g., on the interior surface 14 of wheel 10 where the arc is in a plane perpendicular to the substantially axial direction of wheel 10 in this specific example). Rotor drive keys 12 may be integrally formed with tubewell 20 or may be separate from and mechanically affixed to tubewell 20.

As discussed in further detail below, one or more of the rotor drive keys of plurality of rotor drive keys 12 defines a drive key trough configured to enable the respective rotor drive key to slidably translate over and dovetail with one or more wheel bosses of wheel 10 when the rotor drive key extends in a direction substantially parallel to axis A (e.g., substantially parallel to the axis of rotation of wheel 10). The dovetailing between rotor drive key 12 and the wheel boss substantially secures movement of rotor drive key 12 relative to wheel 10 in a radial direction of wheel 10 (e.g., a direction from axis A toward interior surface 14 and/or from interior surface 14 toward axis A). Rotor drive key 12 defines a drive key trough that is configured to at least partially surround a wheel boss of wheel 10 to substantially secure the rotor drive key 12 against movements relative to wheel 10 in a tangential direction of wheel 10 (e.g., a direction perpendicular to axis A and perpendicular to the radial direction). Rotor drive key 12 includes a tab configured to act against a surface of the wheel boss to oppose relative motion of rotor drive key 12 in an axial direction of wheel 10 (e.g., a direction parallel to axis A). In some examples, a fastener may be positioned axially through rotor drive key 12 and engage with a wheel boss in order to substantially maintain a position of rotor drive key 12 relative to wheel 10 during operations of wheel 10.

Figure 2:
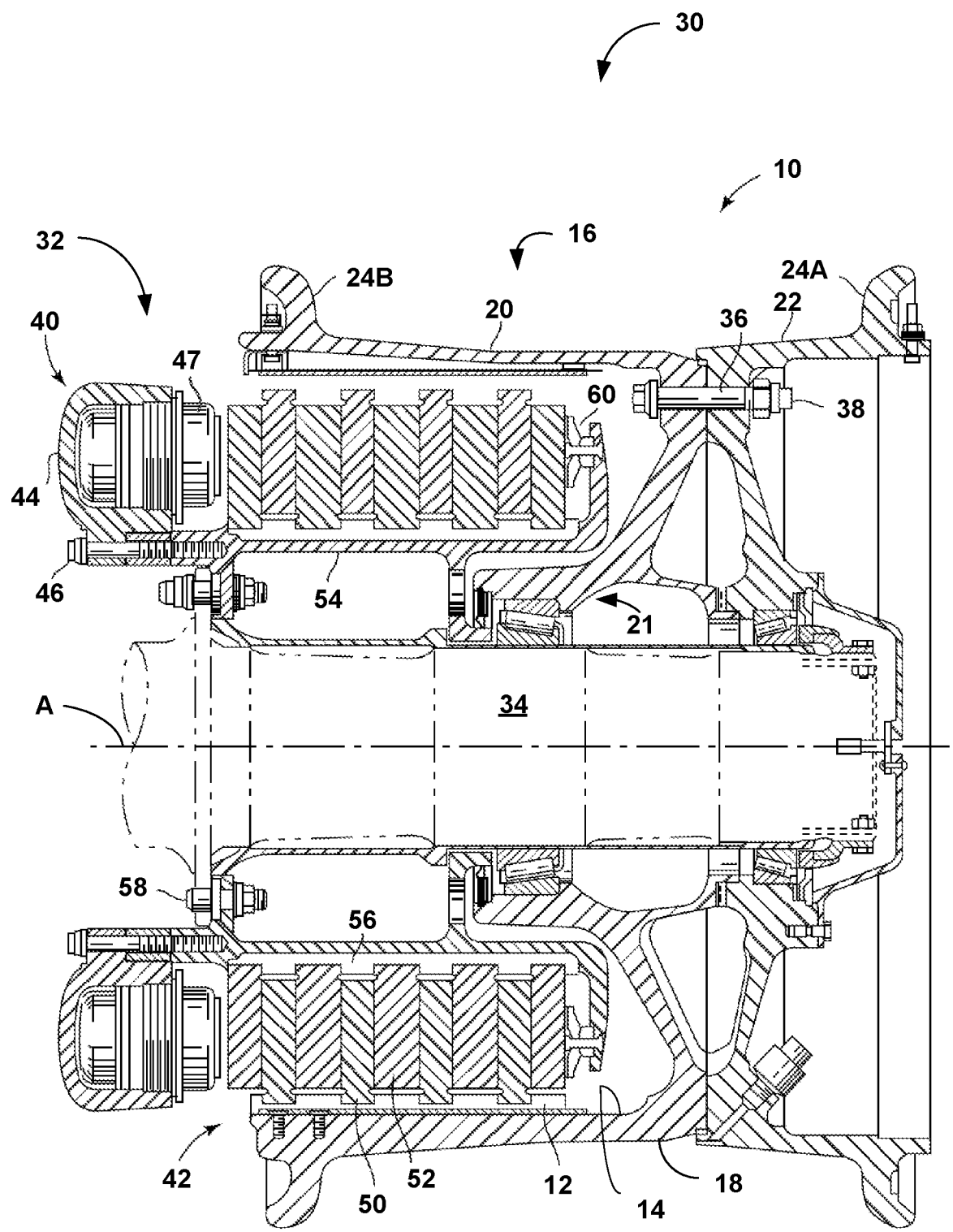
FIG. 2 is a schematic cross-sectional view of an example wheel and brake assembly including the wheel of FIG. 1.

FIG. 2 is a schematic cross-sectional view illustrating an example wheel and brake assembly 30 including an example wheel 10 and a brake assembly 32. Wheel and brake assembly 30 is shown and described to provide context to the example rotor drive key and assemblies including the rotor drive keys and fasteners described herein. The rotor drive keys, fasteners, and other wheel assembly structures described herein, however, may be used with any suitable wheel and brake assembly in other examples.

Wheel 10 includes plurality of rotor drive keys 12, interior surface 14, rim 16, exterior surface 18, tubewell 20, wheel hub 21, wheel outrigger flange 22, outboard bead seat 24A, and inboard bead seat 24B. Wheel 10 may be configured to be rotatably carried on fixed axle 34. In turn, wheel 10 may impart motion to a vehicle including or mounted on the wheel and brake assembly 30. In the example shown in FIG. 2, tubewell 20 and wheel outrigger flange 22 are mechanically coupled by lug bolt 36 and lug nut 38. Other connection techniques may be used in other examples.

Brake assembly 32 includes an actuator assembly 40 and a brake stack 42. Actuator assembly 40 includes actuator housing 44, actuator housing bolt 46, and ram 47. Brake stack 42 includes interleaved rotor brake discs 50 and stator brake discs 52. Rotor brake discs 50 are configured to move relative to stator brake discs 52, e.g., rotationally about axis A and axially along axis A relative to stator brake discs 52. Rotor brake discs 50 are engaged (e.g., interface) with wheel 10, and in particular tubewell 20, by rotor drive keys 12. Stator brake discs 52 are mounted to torque tube 54 by splines 56. Wheel and brake assembly 30 may support any variety of private, commercial, or military aircraft or other type of vehicle.

Wheel and brake assembly 30 may be mounted to a vehicle via torque tube 54 and axle 34. In the example of FIG. 2, torque tube 54 is affixed to axle 34 by a plurality of bolts 58. Torque tube 54 supports actuator assembly 40 and stator brake discs 52. Axle 34 may be mounted on a strut of a landing gear (not shown) or other suitable component of the vehicle to connect wheel and brake assembly 30 to the vehicle.

During operation of the vehicle, braking may be necessary from time to time, such as during landing and taxiing procedures of an aircraft. Wheel and brake assembly 30 is configured to provide a braking function to the vehicle via actuator assembly 40 and brake stack 42. Actuator assembly 40 includes actuator housing 44 and ram 47. Actuator assembly 40 may include different types of actuators such as one or more of, e.g., an electrical-mechanical actuator, a hydraulic actuator, a pneumatic actuator, or the like. During operation, ram 47 may extend away from actuator housing 44 to axially compress brake stack 42 against compression region 60 for braking. Brake stack 42 includes interleaved rotor brake discs 50 and stator brake discs 52.

Rotor brake discs 50 are slidably engaged with rotor drive keys 12 for common rotation with tubewell 20 and rotor drive keys 12. Stator brake discs 52 are mounted to torque tube 54 by splines 56. In the example of FIG. 2, brake stack 42 includes four rotors and five stators. However, a different number of rotors and/or stators may be included in brake stack 42 in other examples. Rotor brake discs 50 and stator brake discs 52 may provide opposing friction surfaces for braking an aircraft. In some examples, wheel and brake assembly 30 may include a thermal barrier between rotor brake discs 50 and tubewell 20 in order to, for example, limit thermal transfer between brake stack 42 and wheel 10.

In some examples, splines 56 may be circumferentially spaced about an outer portion of torque tube 54. Stator brake discs 52 may include a plurality of radially inwardly disposed lug notches along an inner diameter of the brake disc configured to engage with splines 56. Similarly, rotor brake discs 50 may include a plurality of radially inwardly disposed drive slots along an outer periphery (e.g., an outer diameter in the case of a disc having a circular cross-section) of the rotor brake disc. The drive slots may be configured to engage with rotor drive keys 12. As such, rotor brake discs 50 will rotate with the motion of wheel 10 while stator brake discs 52 remain stationary, allowing the friction surfaces of an adjacent stator brake discs 52 and rotor brake discs 50 to engage with one another to deaccelerate the rotation of wheel 10.

Figure 3:
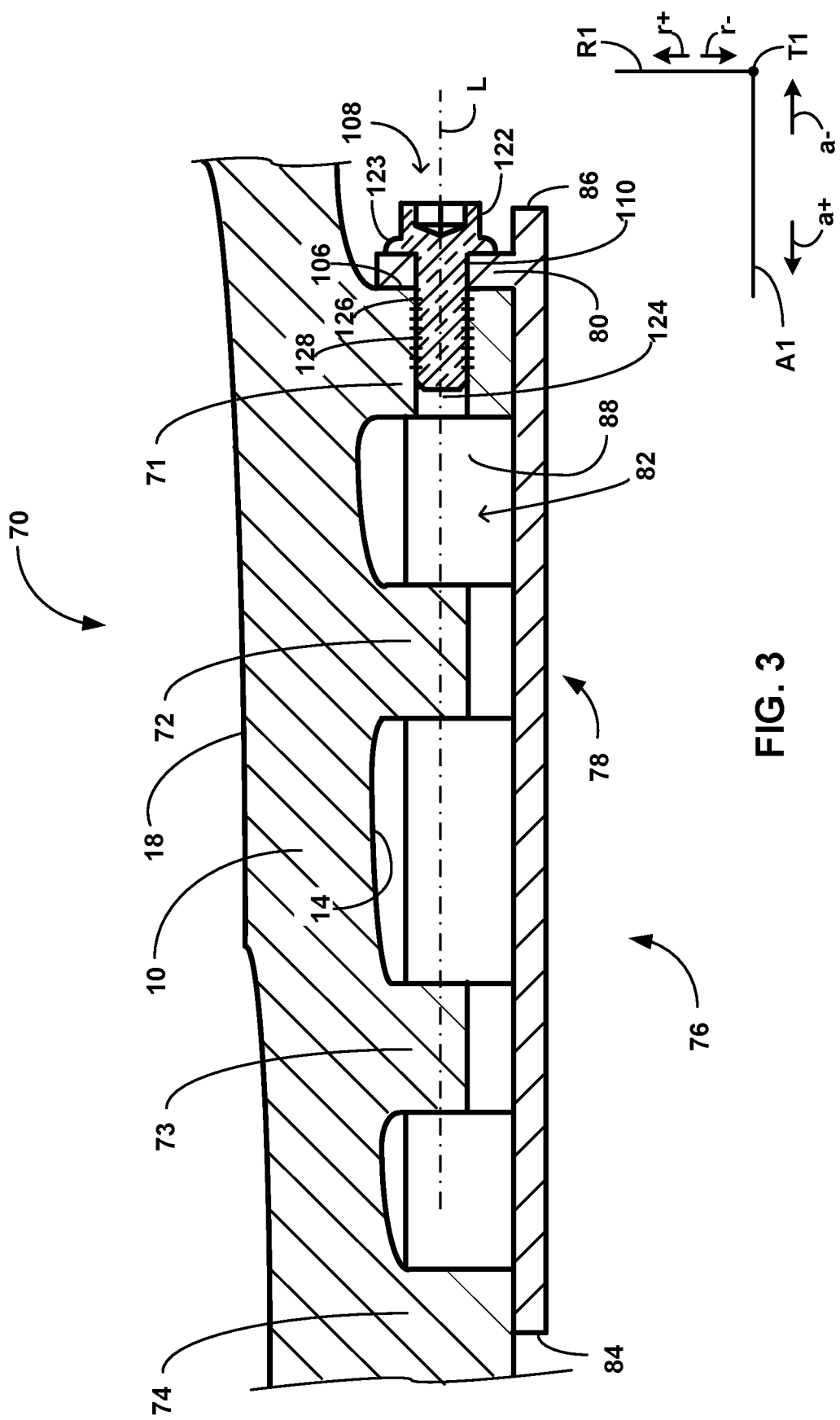
FIG. 3 is a plan view with selected cross-sections of an example assembly including a rotor drive key on an interior surface of a wheel.

FIG. 3 illustrates an example assembly 70 and depicts a cross-section of an example wheel 10 defining exterior surface 18 and interior surface 14, the cross-section being taken parallel to axial direction A in FIG. 1. Interior surface 14 defines wheel boss 71, wheel boss 72, wheel boss 73, and wheel boss 74, which are aligned with each other along a direction parallel to axis A. Wheel bosses 71-74 protrude from interior surface 14 in a generally radial direction R1 of wheel 10. Although four wheel bosses 71-74 are shown in FIG. 3, in other examples, wheel 10 can include any suitable number of wheel bosses aligned with each other along the direction parallel to axis A.

Figure 4:
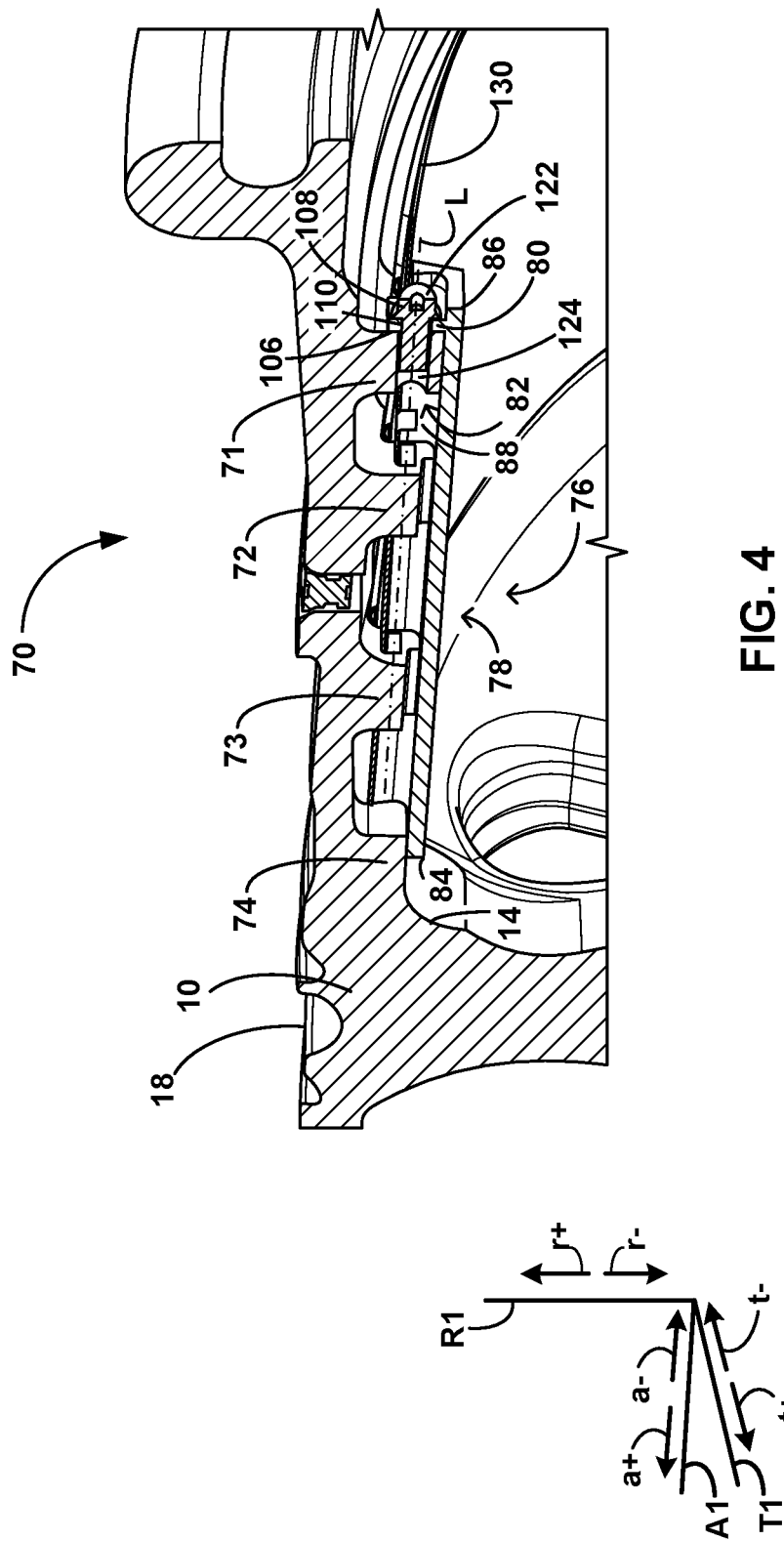
FIG. 4 is a perspective view of an example rotor drive key and fastener on an interior surface of a wheel.
Figure 5:
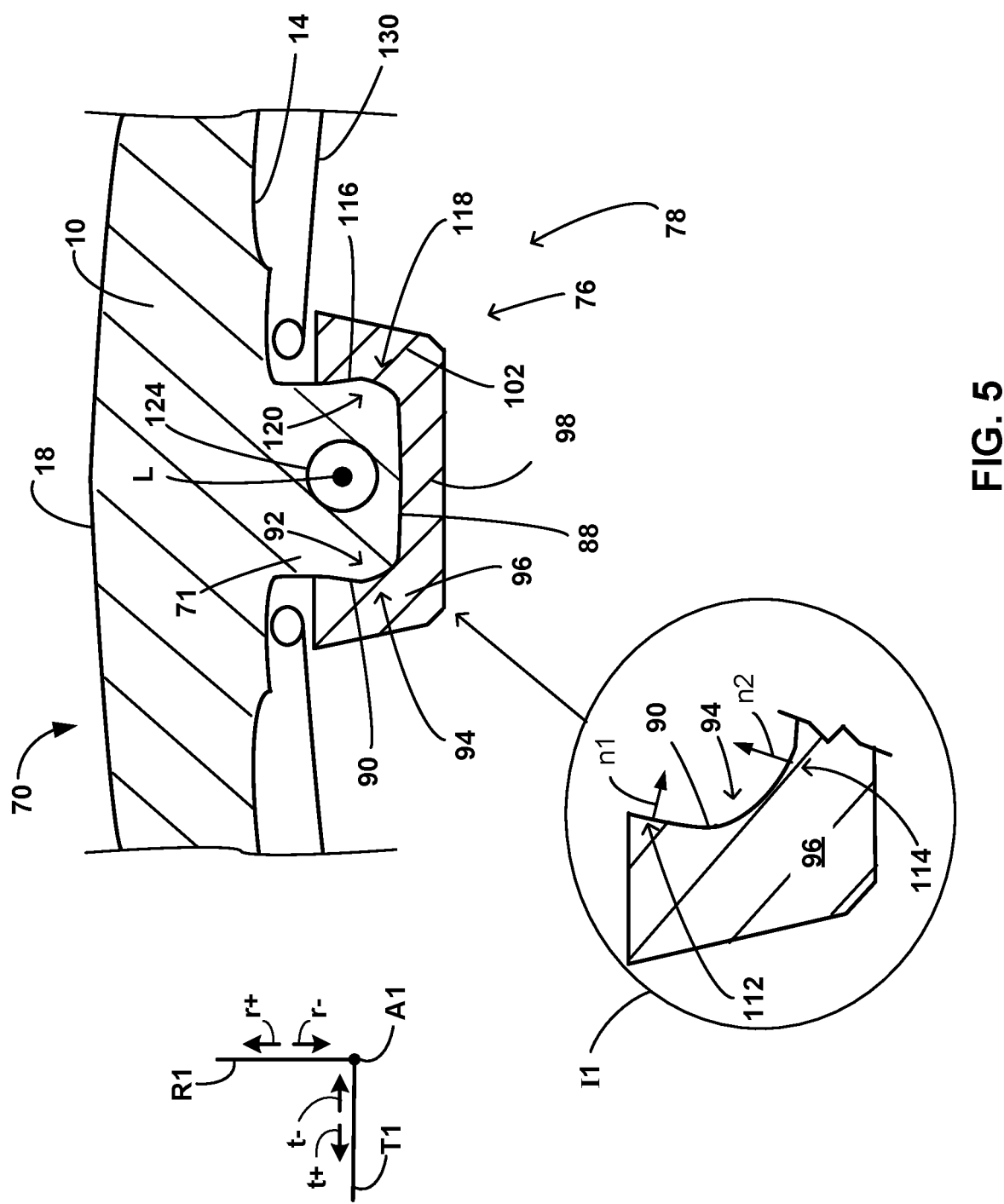
FIG. 5 is a plan view with a cross-section of a rotor drive key including a key protrusion.

In FIG. 3, a line A1 is coincident with the axis of rotation A of wheel 10 (FIGS. 1 and 2) and illustrates the axial direction of wheel 10. A line R1 is perpendicular to and intersects the line A1 and indicates a radial direction of wheel 10. A line T1 is perpendicular to both line A1 and line R1 and indicates a tangential direction of wheel 10 (line T1 is perpendicular to the page in FIG. 3). FIG. 4 is an example perspective view of wheel 10 and assembly 70 of FIG. 3, illustrated with respect to lines A1, R1, and T1. FIG. 5 depicts a cross-section of wheel 10 and assembly 70 illustrated with respect to lines A1, R1, and T1, the cross-section being taken through wheel boss 71 and perpendicular to line A1 (line A1 is perpendicular to the page in FIG. 5).

Assembly 70 comprises a rotor drive key 76, which includes a drive key body 78 and a tab 80. Drive key body 78 is configured to be positioned over one or more wheel bosses 71-74. Drive key body 78 defines a drive key trough 82, which is configured to receive at least part of one or more of the wheel bosses 71-74 in a manner which supports rotor drive key 76 in at least the radial direction R1 of wheel 10. Drive key trough 82 along some portion of drive key body 78 between a first end 84 of drive key body 78 ("first body end 84") and a second end 86 of drive key body 78 ("second body end 86"). Drive key body 78 and/or tab 80 are further configured to support rotor drive key 76 in the axial direction A1 of wheel 10. Drive key trough 82 extends along a central longitudinal axis L (FIG. 3, 4, 5) of drive key body 78. When drive key body 78 receives one or more of wheel bosses 71-74 in drive key trough 82, the central longitudinal axis L of drive key body 78 may be substantially parallel to the axial direction A1 of wheel 10.

Although the configuration of rotor drive key 76 is mainly discussed and illustrated with respect to wheel boss 71 in the following discussion and figures, it is understood that rotor drive key 76 may have substantially similar relationships with any of the other wheel bosses of wheel 10, such as wheel boss 72, wheel boss 73, and/or wheel boss 74.

Drive key body 78 includes an inner surface 88 defining drive key trough 82. Drive key body 78 is configured to translate over wheel boss 71 in the axial direction A1 of wheel 10 in order to position rotor drive key 76 over wheel boss 71 and introduce wheel boss 71 into drive key trough 82. In some examples, drive key body 78 is configured to initially receive wheel boss 71 within drive key trough 82 at first body end 84, and translate in an axial direction A1 of the wheel (e.g., in the direction a+) until tab 80 encounters wheel boss 71.

Inner surface 88 of drive key body 78 is configured to conform with (e.g., dovetail, and/or establish a conforming contact with) some portion of wheel boss 71 when drive key body 78 receives wheel boss 71 in drive key trough 82, in order to substantially oppose and limit movements of drive key body 78 in at least a radial direction R1 of wheel 10. For example, inner surface 88 may include at least one conforming structure (e.g., first inner surface 90 shown in FIG. 5) configured to conform with and/or complement a boss feature of wheel boss 71 (e.g., boss protrusion 92 of wheel boss 71 shown in FIG. 5). The boss feature may be defined by an outer profile of wheel boss 71 (e.g., a profile defined in a plane perpendicular to central longitudinal axis L). In some examples, the conforming structure of inner surface 88 may include a recess, a protrusion, or a recess and a protrusion configured to conform with the boss feature when drive key body 78 receives wheel boss 71.

At least a portion of the conforming structure of inner surface 88 includes a surface having a surface normal (e.g., a unit vector perpendicular to the surface) with a directional component substantially parallel to the radial direction R1 of wheel 10 when drive key body 78 receives wheel boss 71, such that the surface opposes relative motion of rotor drive key 76 in at least a radial direction R1 when the surface contacts wheel boss 71. The conforming structure of inner surface 88 conforms to the boss feature of wheel boss 71 such that, when drive key body 78 experiences a force in a radial direction R1 of wheel 10 (e.g., r− and/or r+ (FIGS. 3-5)), wheel boss 71 exerts an opposing reaction force on drive key body 78 to maintain drive key body 78 in substantially stationary radial position relative to wheel 10.

The conforming structure of inner surface 88 of drive key body 78 may be configured to at least partially correspond in shape to the form of some portion of wheel boss 71. For example, the conforming structure of inner surface 88 may be a recess (e.g., drive key recess 94 (FIG. 5)) defined by inner surface 88 which substantially corresponds in shape to some portion of the outer profile of boss protrusion 92 (FIG. 5). In some examples, the conforming structure of inner surface 88 may be a protrusion defined by inner surface 88 which substantially corresponds in shape to some portion of a recess of wheel boss 71 or vice versa or a combination thereof. The conforming structure of inner surface 88 may be complementary to a surface of wheel boss 71. For example, the conforming structure of inner surface 88 may be concave surface configured to complement a convex surface of wheel boss 71. In addition or instead, the conforming structure of inner surface 88 may be a convex surface configured to complement a concave surface of wheel boss 71. Drive key body 78 may be configured to substantially dovetail with a portion of wheel boss 71, such that inner surface 88 of drive key body 78 substantially conforms with wheel boss 71 over some portion of the length of drive key body 78 (e.g., over some displacement in the axial direction A1 of wheel 10).

Inner surface 88 of drive key body 78 is configured to dovetail with wheel boss 71 by conforming with some part of wheel boss 71 when drive key body 78 is translated over wheel boss 71 in the axial direction A1. For example, inner surface 88 may define a recess configured to receive a protruding structure of wheel boss 71, and/or inner surface 88 may define a protrusion configured to insert into a recess defined by wheel boss 71. Inner surface 88 is configured such that, when the drive key body 78 engages (e.g., contacts and/or frictionally engages) wheel boss 71 and drive key body 78 experiences a force in a radial direction R1 of wheel 10 (e.g., r− and/or r+), wheel boss 71 exerts an opposing reaction force on drive key body 74 to maintain drive key body 74 in substantially stationary radial position relative to wheel 10.

Drive key body 78 may be configured to oppose relative motion of drive key body 78 in a tangential direction T1 of wheel 10 when drive key trough 82 receives wheel boss 71. As illustrated in FIG. 5, a key first side 96 of drive key body 78 may substantially face wheel boss 71 and oppose relative motion of drive key body 78 in a tangential direction T1 of wheel 10 (e.g., in the direction t− (FIGS. 3-5)). Key first side 96 is configured such that when drive key body 78 experiences a force in a tangential direction T1 of wheel 10 (e.g., in the direction t−), wheel boss 71 exerts an opposing reaction force on drive key body 78 to limit motion of drive key body 48 relative to wheel 10 in the tangential direction T1 (e.g., to maintain drive key body 78 in substantially stationary tangential position relative to wheel 10).

A key base section 98 of drive key body 78 may substantially wrap around wheel boss 71 and extend from key first side 96 to a key second side 102. Key second side 102 substantially faces a side of wheel boss 71 opposite that faced by key first side 96. Key second side 102 is configured such that when drive key body 78 experiences a force in a tangential direction T1 of wheel 10 (e.g., in the direction t+ (FIGS. 3-5)), wheel boss 71 exerts an opposing reaction force on drive key body 78 to limit movement of drive key body 78 relative to wheel 10 in the tangential direction T1 (e.g., to maintain drive key body 78 in substantially stationary tangential position relative to wheel 10).

Key first side 96, key second side 102, and key base section 98 may define drive key trough 82, and inner surface 88 may include a surface of one or more of key first side 96, key second side 102, and key base section 98. Thus, inner surface 88 may be configured to maintain drive key body 78 in a substantially stationary tangential position relative to wheel 10.

Tab 80 (FIGS. 3 and 4) extends from drive key body 78 and is configured to support rotor drive key 76 against substantial relative motion in an axial direction A1 of wheel 10 when drive key trough 82 receives wheel boss 71. Tab 80 includes tab bearing surface 106 configured to substantially face some portion of wheel boss 71 and oppose movement of drive key body 78 in an axial direction A1 (e.g., direction a+ (FIGS. 3 and 4)). Tab bearing surface 106 is configured such that a force on drive key body 78 in an axial direction A1 (e.g., the direction a+ (FIGS. 3 and 4)) causes wheel boss 71 to exert an opposing reaction force on tab bearing surface 106, in order to limit movement of drive key body 78 relative to wheel 10 in the axial direction A1 (e.g., to maintain drive key body 78 in a substantially stationary axial position).

Tab 80 defines tab aperture 110 configured to receive a fastener 108 in an axial direction A1 when rotor drive key 76 is positioned over wheel boss 71. When rotor drive key 76 is positioned over wheel boss 71 and fastener 108 extends through tab aperture 110, tab 80 is configured to engage wheel boss 71 to substantially prevent relative motion of drive key body 78 in an axial direction A1 (e.g., in the direction a− and/or a+). In some examples, fastener 108 includes bolt threads 126 configured to threadably engage with boss threads 128 defined by wheel boss 71. In some examples, fastener 80 is configured to extend through boss aperture 124 and engage a nut (not shown) or other device on a side of wheel boss 71 opposite fastener head 122. Thus, tab 80 may be configured to maintain drive key body 78 in a substantially stationary axial position relative to wheel 10.

Rotor drive key 76 may be configured in a manner substantially securing rotor drive key 76 in the radial R1, tangential T1, and axial A1 directions of wheel 10 when rotor drive key 76 is positioned on wheel 10. Drive key body 78 may be configured to enable translation of rotor drive key 76 over wheel boss 71 in an axial direction A1 while substantially conforming to wheel boss 71, potentially allowing for ease of assembly and/or disassembly. Radial, tangential, and axial support can be provided in a manner that may eliminate a necessity for bolts, screws and/or other separate mechanical components extending substantially in a radial direction of wheel 10.

Figure 6:
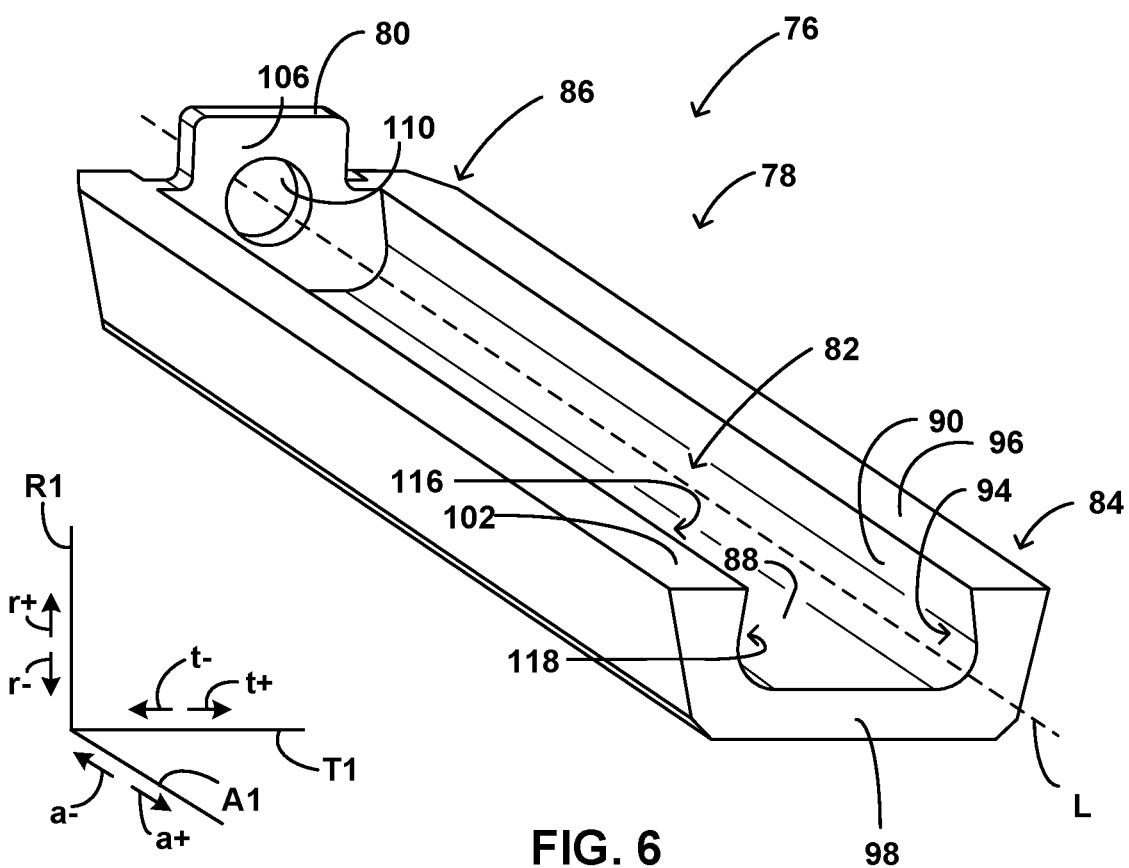
FIG. 6 is a perspective view of an example rotor drive key.

FIG. 6 illustrates a perspective view on an example rotor drive key 76 including drive key body 78, tab 80, drive key trough 82, first body end 84, second body end 86, key first side 96, key base section 98, key second side 102, tab bearing surface 106, and tab aperture 110. Key first side 96, key second side 102, and key base section 98 define drive key trough 82. Central longitudinal axis L extends through drive key trough 82 between key first side 96, key second side 102, and key base section 98. FIG. 6 includes lines A1, R1, and T1 of wheel 10 for reference to FIGS. 3-5, however such an orientation of rotor drive key 76 is not required. Rotor drive key 76 may have any orientation relative to a wheel when rotor drive key 76 is not installed on the wheel.

Drive key trough 82 extends over some length between first body end 84 and second body end 86. Drive key trough 82 may substantially originate at first body end 84, so that drive key trough 82 receives wheel boss 71 when drive key body 78 is translated over wheel boss 71 in an axial direction of wheel 10 (e.g., in the direction a+). Drive key body 78 may define drive key trough 82 such that rotor drive key 76 can be positioned on wheel 10 (e.g., installed or removed) by placing wheel boss 71 within drive key trough 82 at first body end 84, and then translating drive key body 78 in an axial direction A1 (e.g., the direction a+) over wheel boss 71. Inner surface 88 is configured to substantially conform to some portion of wheel boss 71 when rotor drive key 76 is positioned on wheel 10.

Inner surface 88 extends over at least some portion of key first side 96 and defines drive key recess 94, which is configured to receive boss protrusion 92 defined by an outer profile of wheel boss 71, e.g., as drive key body 78 is translated over wheel boss 71 in an axial direction A1 of the wheel 10. Drive key recess 94 is configured to receive boss protrusion 92 when boss protrusion 92 inserts into drive key recess 94 in an axial direction A1 of wheel 10 (e.g., when drive key body 78 translates over wheel boss 71 in the axial direction A1). Drive key recess 94 is configured to substantially conform to boss protrusion 92 in a plane substantially perpendicular to an axial direction A1 of wheel 10 (e.g., substantially parallel to a radial R1 and tangential T1 direction). Drive key recess 94 may be configured to engage (e.g., contact and/or frictionally engage) boss protrusion 92 when drive key recess 94 receives boss protrusion 92. In some examples, drive key recess 94 is configured to provide an engineering fit with boss protrusion 92, such as a sliding fit, a locational fit, a transitional fit, or an interference fit.

Drive key recess 94 defines a profile in a plane perpendicular to longitudinal axis L configured to allow boss protrusion 92 to insert into drive key recess 94 when boss protrusion 92 approaches drive key recess 94 in an axial direction A1 of wheel 10. For example, drive key recess 94 may receive boss protrusion 92 when drive key body 78 is translated over boss protrusion 92 in an axial direction A1 during installation on wheel 10. In some examples, the profile may include one or more curved segments, one or more linear segments, or may include both curved and linear segments. In some examples, drive key recess 94 may have a concavity around central longitudinal axis L, such that first inner surface 90 engages boss protrusion 92 when drive key body 78 experiences a force in a radial direction R1 of wheel 10 (e.g., r+ and/or r−). Thus, drive key recess 94 is configured to allow translation of rotor drive key over wheel boss 71 in an axial direction A1 of wheel 10 while conforming to wheel boss 71 in a manner that substantially secures drive key body 78 against movement in a radial direction R1 (r− and/or r+) of wheel 10.

For example, FIGS. 5 and 6 illustrate first inner surface 90 of drive key body 78 defining a drive key recess 94 with a concavity around central longitudinal axis L. First inner surface 90 may be configured to substantially wrap around a portion of boss protrusion 92 of wheel boss 71 to substantially oppose movement of drive key body 78 in both the r+ and r− directions, such that the concavity of first inner surface 90 substantially secures drive key body 78 in a stationary radial position relative to wheel 10 when drive key recess 94 receives boss protrusion 92. As illustrated at Inset I1 (FIG. 5), a first section 112 of first inner surface 90 may be configured such that a first surface normal n1 (e.g., a unit vector) extends perpendicularly from first section 112 toward central longitudinal axis L. First section 112 has a positive concavity with respect to first surface normal n1 (e.g., curves towards first surface normal n1), such that inner surface 88 substantially curves around central longitudinal axis L. The positive concavity around first surface normal n1 causes first section 112 to engage boss protrusion 92 and oppose relative motion of drive key body 78 in at least first radial direction (e.g., the direction r−) when drive key recess 94 receives boss protrusion 92. Thus, first section 112 of first inner surface 90 is configured such that, when a force having a component parallel to first surface normal n1 acts on drive key body 78, first inner surface 90 transmits the force to boss protrusion 92, and boss protrusion 92 exerts an oppositely oriented reaction force on first inner surface 90. The combined force and reaction force of first inner surface 90 and boss protrusion 92 respectively substantially secure drive key body 78 against relative motion in the first radial direction (e.g., the direction r−) relative to wheel 10.

In some examples, first inner surface 90 includes a second section 114 configured to oppose relative motion of drive key body 78 in a second radial direction (e.g., the direction r+) opposite the first radial direction when drive key recess 94 receives boss protrusion 92. Second section 114 includes a second surface normal n2 extending from first inner surface 90 toward central longitudinal axis L, with second section 114 configured to have a positive concavity with respect to second surface normal n2 (e.g., curves towards second surface normal n2). The positive concavity around second surface normal n2 causes second section 114 to engage boss protrusion 92 and oppose relative motion of drive key body 78 in the second radial direction (e.g., the direction r+) when drive key recess 94 receives boss protrusion 92. Second section 114 of first inner surface 90 is configured such that, when a force having a component parallel to second surface normal n2 acts on drive key body 78, first inner surface 90 transmits the force to boss protrusion 92 and boss protrusion 92 exerts an oppositely oriented reaction force on first inner surface 90. The combined force and reaction force of first inner surface 90 and boss protrusion 92 respectively substantially secure drive key body 78 against relative motion in the second radial direction (e.g., the direction r+) relative to wheel 10.

Thus, first inner surface 90 is configured such that drive key recess 94 receives boss protrusion 92 of wheel boss 71 when drive key body 78 is translated over wheel boss 71 in an axial direction A1 of wheel 10. Drive key recess 94 extends over some length of drive key body between first body end 84 and second body end 86. Drive key recess 94 may extend in a direction substantially perpendicular to central longitudinal axis L. When drive key recess 94 receives boss protrusion 92, at least first section 112 and/or second section 114 face boss protrusion 92 such that, when drive key body 78 experiences a force in a radial direction R1 of wheel 10 (e.g., the direction r− and/or r+), first section 112 and/or second section 114 transmits the force to boss protrusion 92, and boss protrusion 92 exerts an oppositely oriented reaction force on drive key body 78 to substantially secure drive key body 78 against relative motion in the radial direction R1 (e.g., the direction r− and/or r+) relative to wheel 10.

In some examples, key second side 102 includes second inner surface 116 (FIG. 5, 6) facing first inner surface 90 of key first side 96. Second inner surface 116 may define a second conforming structure configured to substantially conform with a second boss feature of wheel boss 71. For example, as illustrated at FIGS. 5 and 6, second inner surface 116 may define a drive key recess 118 configured to receive a boss protrusion 120 of wheel boss 71. Boss protrusion 120 is displaced from the boss protrusion 92 in a tangential direction T1 of wheel 10 (e.g., on an opposite side of wheel boss 71 from boss protrusion 92). Drive key recess 118 may be configured with respect to second inner surface 116 in a manner similar to the configuration of drive key recess 94 with respect to first inner surface 90, and may be configured with respect to boss protrusion 120 in a manner similar to the configuration of first inner surface 90 with respect to boss protrusion 92. For example, drive key recess 118 may be configured to receive boss protrusion 120 when drive key body 78 translates over wheel boss 71 in the axial direction A1).

In some examples, second inner surface 116 of key second side 102 may include a first section and a second section, which may be configured with respect to second inner surface 116 in a manner similar to the configuration of first section 112 and second section 114 defining drive key recess 94 of first inner surface 90, and may be configured with respect to boss protrusion 120 in a manner similar to the configuration of first section 112 and second section 114 with respect to boss protrusion 92. For example, the first portion of second inner surface 116 may be configured such that, when a force in a first radial direction (e.g., the direction r−) acts on drive key body 78, second inner surface 116 transmits the force to boss protrusion 120, and boss protrusion 120 exerts an oppositely oriented reaction force on second inner surface 116. The second portion of second inner surface 116 may be configured such that, when a force in a second radial direction (e.g., the direction r+) acts on drive key body 78, second inner surface 116 transmits the force to boss protrusion 120, and boss protrusion 120 exerts an oppositely oriented reaction force on second inner surface 116.

As discussed, first inner surface 90 of drive key body 78 may act to oppose relative motion of rotor drive key 76 in a tangential direction T1 of wheel 10 (e.g., in the direction t− (FIG. 4, 5)) when drive key trough 82 receives wheel boss 71. For example, as illustrated at FIG. 5, first inner surface 90 may substantially face wheel boss 71 in a first tangential direction T1 (e.g., the direction t−) of wheel 10. First surface normal n1 has a directional component from first section 112 and toward central longitudinal axis L, such that first section 112 may engage (e.g., contact and/or frictionally engage) some portion of wheel boss 71 (e.g., boss protrusion 92) when drive key body 78 experiences a force in the first tangential direction. In like manner, second surface normal n2 has a directional component from second section 114 and toward central longitudinal axis L, such that second section 114 may engage (e.g., contact and/or frictionally engage) some portion of wheel boss 71 (e.g., boss protrusion 92) when drive key body 78 experiences the force in the first tangential direction. Thus, first inner surface 90 may be configured to transmit the force in the first tangential direction to wheel boss 71 (e.g., via the first section 112 and/or second section 114), causing wheel boss 71 to exert an oppositely oriented reaction force on first inner surface 90. The combined force and reaction force of first inner surface 90 and wheel boss 71 respectively substantially secure drive key body 78 against relative motion in the first tangential direction (e.g., the direction t−).

Drive key body 78 is configured to wrap around wheel boss 71 such that second inner surface 116 of key second side 102 substantially faces a side of wheel boss 71 opposite a side faced by first inner surface 90, in order to oppose relative motion of drive key body 78 in a second tangential direction T1 (e.g., the direction t+) of wheel 10. A first section and/or second section of second inner surface 116 may engage (e.g., contact and/or frictionally engage) some portion of wheel boss 71 (e.g., boss protrusion 120) when drive key body 78 experiences a force in the second tangential direction. Second inner surface 116 may be configured to transmit the force in the second tangential direction to wheel boss 71, causing wheel boss 71 to exert an oppositely oriented reaction force on second inner surface 116. The combined force and reaction force of second inner surface 116 and wheel boss 71 respectively substantially secures drive key body 78 against relative motion in the second tangential direction (e.g., the direction t+). As discussed, second inner surface 116 may include a first section and a second section, which may be configured with respect to second inner surface 116 in a manner similar to the configuration of first section 112 and second section 114 with respect to first inner surface 90, and may be configured with respect to boss protrusion 120 in a manner similar to the configuration of first section 112 and second section 114 with respect to boss protrusion 92.

Tab 80 is configured to provide axial support to drive key body 78 when drive key recess 94 and/or drive key recess 118 receive the respective boss protrusion 92, 120. Tab 80 may be configured to limit movement of rotor drive key 76 relative to wheel 10 in an axial direction (e.g., secure rotor drive key 76 in an axial position on wheel 10) as drive key recess 94 and/or drive key recess 118 engage with the respective boss protrusion 92, 120 to provide radial and/or tangential support to rotor drive key 76. For example, tab 80 may act to transmit axial forces on rotor drive key 76 to wheel boss 71 to substantially eliminate movement of rotor drive key 76 in an axial direction A1 of wheel 10 when rotor drive key 76 is positioned on wheel 10.

Tab 80 may be located within drive key trough 82 at any point between or including first body end 84 and second body end 86. In an example, tab 80 is located at or near second body end 86 and drive key body 78 is configured to be positioned over (e.g., installed) wheel boss 71 with first body end 84 as the leading end without interference from tab 80.

Tab 80 is configured to allow drive key body 78 to be positioned on wheel 10 by axially translating drive key body 78 over at least wheel boss 71, such that drive key recess 94 and/or drive key recess 118 receive the respective boss protrusion 92, 120 during the axial translation. Tab 80 is configured to encounter wheel boss 71 during the axial translation and oppose continued translation of drive key body 78 in an axial direction A1 of wheel 10 (e.g., in the direction a+ (FIG. 3-6)). Fastener 108 (FIG. 3,4) can be inserted through both tab 80 and wheel boss 71 to limit movement of tab 80 relative to wheel boss 71, e.g., to secure tab 80 in a substantially stationary position relative to wheel boss 71. Tab 80 is configured to establish and/or maintain mechanical communication with some portion of drive key body 78 (e.g., key base section 98, key first side 96, and/or key second side 102), such that axial reaction forces from wheel boss 71 and/or fastener 108 to tab bearing surface 106 at least partially transmit to other portions of drive key body 78 and substantially secure rotor drive key 76 against movement in the axial direction A1 of wheel 10.

Tab 80 may define an extent to which an axial translation of rotor drive key 76 over wheel boss 71 can occur. For example, when rotor drive key 76 is intended to position simultaneously over one or more of wheel bosses 72-74 in additional to wheel boss 71, tab 80 may be located to ensure drive key trough 82 has sufficient axial length to at least partially surround each of the applicable wheel bosses before tab 80 encounters wheel boss 71.

As illustrated at FIGS. 3-6, tab 80 includes tab bearing surface 106 configured to substantially face some portion of wheel boss 71 and oppose movement of drive key body 78 in an axial direction A1 (e.g., direction a+ (FIG. 3, 4)). Tab bearing surface 106 is configured such that a force on drive key body 78 in the axial direction a+ (FIG. 3, 4) causes wheel boss 71 to exert a reaction force on tab bearing surface 106 in the axial direction a−, in order to maintain drive key body 78 in a substantially stationary axial position. In some examples, tab bearing surface 106 is a substantially planar surface. In addition or instead, in other examples, tab bearing surface 106 includes a surface defining a curvature. In addition, in some examples, tab bearing surface 106 defines a surface configured to substantially conform with a portion of wheel boss 71.

As discussed, tab 80 may be secured in a substantially stationary position relative to wheel boss 71. Tab 80 includes tab aperture 110 configured to receive fastener 108 extending in a substantially axial direction A1 of wheel 10, to secure rotor drive key 76 relative to wheel 10 and limit relative movement of rotor drive key 76 in an axial direction A1 of wheel 10 (e.g., in the direction a− and/or a+). Tab aperture 110 is configured to cause tab 80 to engage fastener 108 when fastener 108 extends through tab aperture 110 and into wheel boss 71. For example, tab aperture 110 may be configured such that fastener head 122 of fastener 108 acts to compress some portion of tab 80 (e.g., around the perimeter of tab aperture 110) when a shank of fastener 108 extends through tab aperture 110 and engages (e.g., threadably engages) with wheel boss 71. Tab aperture 110 substantially maintains a portion of tab 80 (e.g., the portion of tab 80 surrounding tab aperture 110) between fastener head 122 and wheel boss 71 when fastener 108 engages wheel boss 71, in order to maintain tab 80 and drive key body 78 substantially stationary with respect to wheel boss 71. In an example, central longitudinal axis L extends between key first side 96, key second side 102, and key base section 98 from first body end 84 to second body end 86 and passes through tab aperture 110. In some examples, when fastener 108 engages wheel boss 71, central longitudinal axis extends through some portion of fastener 108.

Fastener 108 may engage wheel boss 71 in a manner which substantially secures fastener 108 against relative motion in at least an axial direction A1 of wheel 10. Fastener 108 may extend into wheel boss 71 via, for example, boss aperture 124 defined by wheel boss 71 (FIG. 3-5). In some examples, fastener 108 includes bolt threads 126 configured to threadably engage with boss threads 128 defined by wheel boss 71 within boss aperture 124 and maintain fastener 108 in a substantially stationary position relative to wheel boss 71. Bolt threads 126 may be external threads and boss threads 128 may be internal threads. In some examples, fastener 108 may extend through boss aperture 124 and threadably engage with a nut or other fastening device configured to maintain fastener 108 substantially stationary with respect to wheel boss 71.

In some examples, fastener 108 is configured to substantially maintain tab bearing surface 106 in contact with wheel boss 71, and/or maintain tab bearing surface 106 in contact with one or more materials (e.g., a compression washer) between tab bearing surface 106 and wheel boss 71. Fastener 108 may be configured to substantially maintain some portion of tab 80 (e.g., the portion of tab 80 surrounding tab aperture 110) between fastener head 122 and wheel boss 71 when fastener 108 fastens to wheel boss 71 (e.g., by threadably engaging wheel boss 71, or extending through boss aperture 124 and engaging a nut). For example, fastener 108 may be a flange bolt having flange 123 (FIG. 3) configured to substantially trap tab 80 between the head of fastener 108 and wheel boss 71 when fastener 108 fastens to wheel boss 71.

In some examples, rotor drive key 76 may include a locking mechanism (not shown) configured to rotationally lock fastener 108 in place. In some such examples, the locking mechanism may include one or more of a locking plate, a retainer clip, a lock washer, a Nord-lock washer, a nylon insert, a retainer pin, a castle locking device, an adhesive, a safety wire, a safety cable, a retainer clip, or the like. FIG. 4 and FIG. 5 also depicts a heat shield 130 which may be deployed on the interior surface 14 of wheel 10.

Thus, rotor drive key 76 may be configured in a manner which limits (e.g., prevents or substantially prevents) relative motion in the radial R1, tangential T1, and axial A1 directions of wheel 10 when rotor drive key 76 is positioned on wheel 10. Inner surface 88 may be configured to dovetail with wheel boss 71 in a manner substantially securing movement of rotor drive key 76 in at least a radial direction R1 of the wheel (e.g., in the direction r+ and/or r−). Drive key trough 82 may partially surround wheel boss 71 to substantially secure rotor drive key 76 against movement in at least a tangential direction T1 of the wheel (e.g., in the direction t+ and/or t−). Tab bearing surface 106 of tab 80 may be configured to act against wheel boss 71 to oppose relative motion of rotor drive key 76 in an axial direction A1 of wheel 10 (e.g., in the direction a+). Fastener 108 may extend through tab 80 and engage wheel boss 71 to maintain tab bearing surface 106 in opposition to wheel boss 71 and substantially secure rotor drive key 76 against relative motion in an axial direction A1 of wheel 10 (e.g., in the direction a−). Thus, radial, tangential, and axial support can be provided in a manner that may eliminate a necessity for bolts and/or screws extending substantially in a radial direction of wheel 10. Further, inner surface 88 may be configured to allow translation of rotor drive key 76 over wheel boss 71 in an axial direction A1 while substantially conforming to wheel boss 71, potentially allowing for ease of assembly and/or disassembly.

Figure 7:
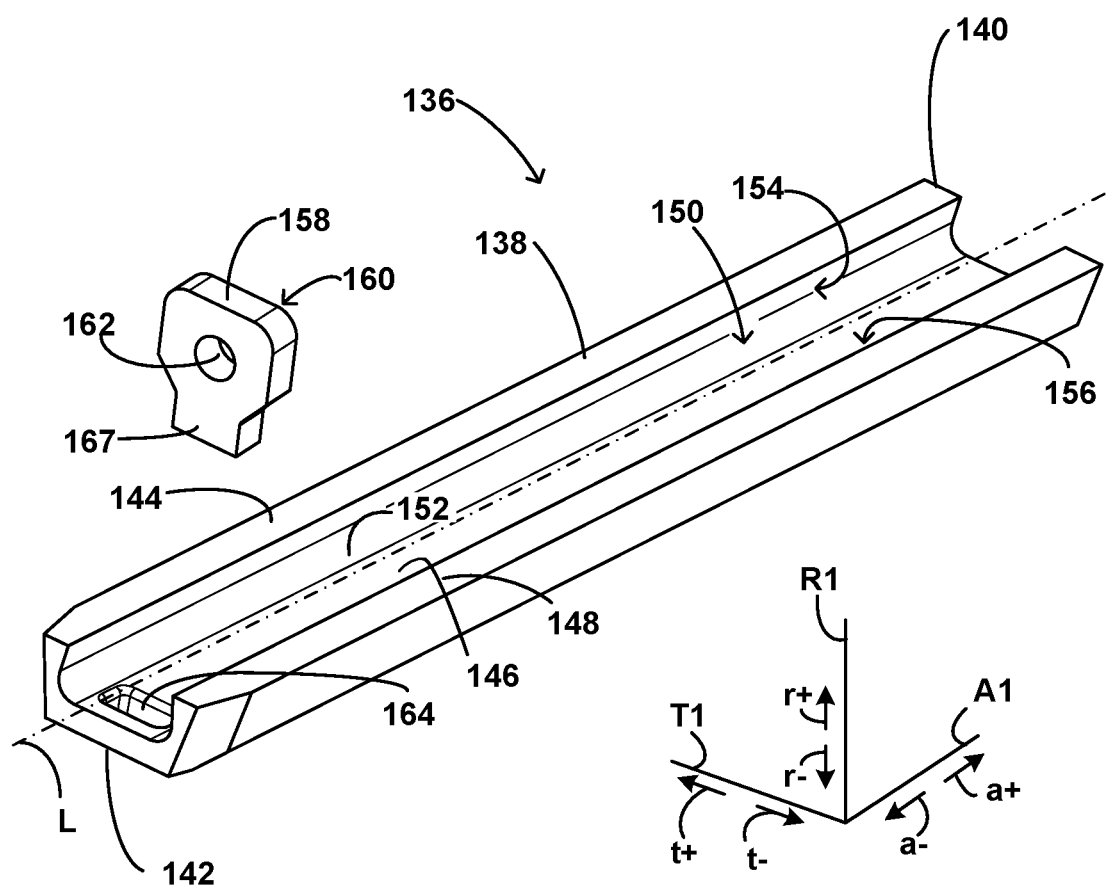
FIG. 7 is a perspective view of an example rotor drive key including a detachable tab.

In some examples, the drive key body and the tab have a unitary (or unibody) construction and are not separable from each other without adversely impacting the structural integrity of the drive key body and/or the tab. In other examples, the drive key body and the tab are separable components of the rotor drive key. For example, FIG. 7 illustrates an example assembly including a rotor drive key 136 and a detachable tab 158 physically separate from and configured to mechanically connect to rotor drive key 136. Rotor drive key 136 includes drive key body 138, first body end 140, second body end 142, key first side 144 defining drive key recess 154, key base section 146, key second side 148 defining drive key recess 156, drive key trough 150, and inner surface 152, which may be configured individually and relation to each other in the same manner as that discussed for the like-named components of rotor drive key 76. Detachable tab 158 defines tab bearing surface 160 and tab aperture 162.

Detachable tab 158 is configured to insert into recess 164 defined by drive key body 138. Supporting recess 164 may be located within drive key trough 150 at any point between or including first body end 140 and second body end 142. In an example, supporting recess 164 is located substantially at second body end 142, and drive key body 138 is configured to receive wheel boss 71 (FIG. 3-5) via first body end 140 as the leading end. Tab 158 may include a tab protrusion 166 configured to insert into supporting recess 164. Tab protrusion 166 may be configured to provide an engineering fit within supporting recess 164, such as a sliding fit, a locational fit, a transitional fit, or an interference fit. When tab protrusion 166 is inserted into supporting recess 164, tab 158, tab bearing surface 160, and tab aperture 162 may be configured individually and relation to other components of rotor drive key 136 in the same manner as that discussed for tab 80, tab bearing surface 106, and tab aperture 110 relative to the other components of rotor drive key 76.

Use of detachable tab 158 allows tab 158 and drive key body 138 to be constructed of differing materials, and may enhance the manufacturability of drive key body 138. For example, drive key body 138 may have substantially similar cross-section (perpendicular to central longitudinal axis L) between first body end 140 and second body end 142, allowing drive key body 138 to be formed at least in part as extrusion or a drawing. This may simplify the use of materials such as extruded composites, certain thermal insulative materials, or other particular materials which may be more difficult to form with non-extruding (or drawing) fabrication methods.

Figure 8:
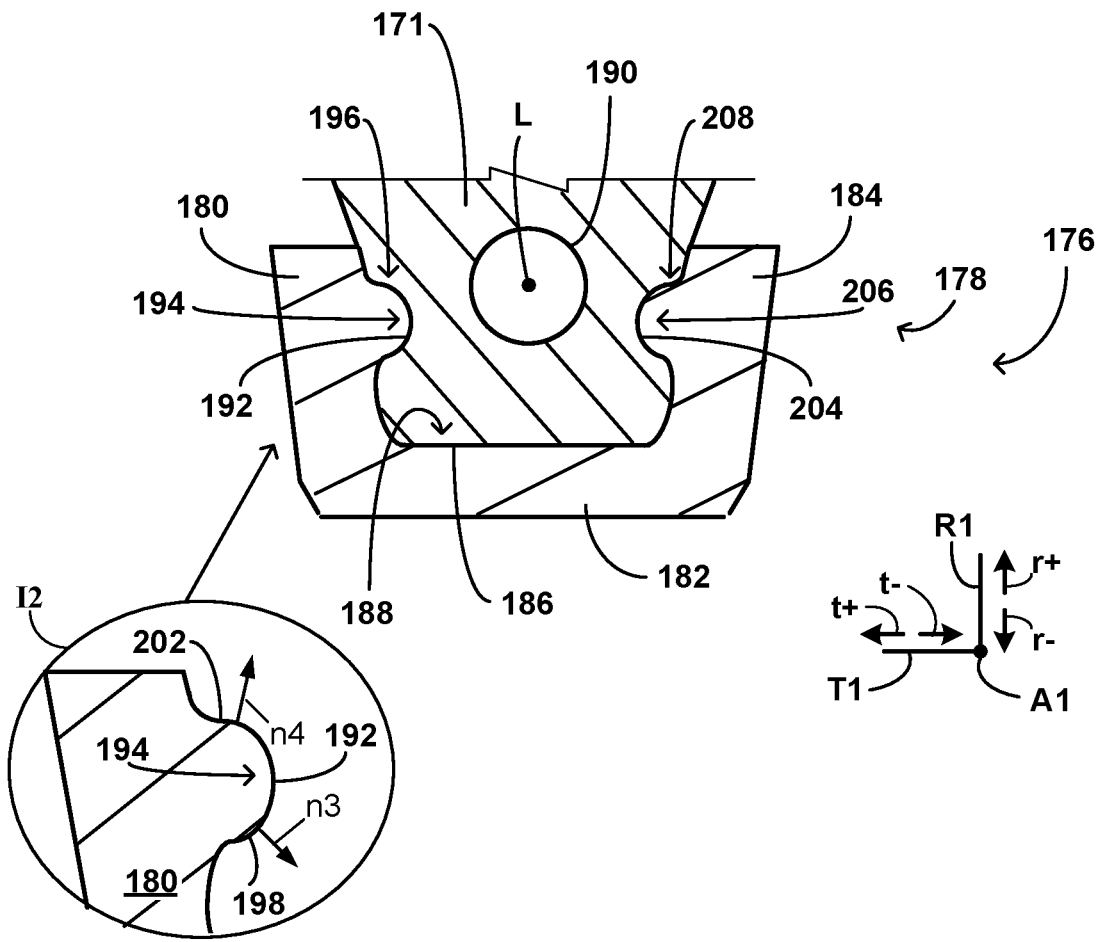
FIG. 8 is a plan view with a cross-section of a rotor drive key including a key recess.

As discussed, in some examples, a rotor drive key may define a protrusion configured to insert into a recess of a wheel boss as the rotor drive key translates over the wheel boss in an axial direction A1 of wheel 10. As an example, FIG. 8 depicts a cross-section of an example rotor drive key 176 positioned over a wheel boss 171, with the cross-section taken through wheel boss 171 and perpendicular to the axial direction A1 of wheel 10. Rotor drive key 176 includes drive key body 178, key first side 180, key base section 182, key second side 184, inner surface 186, drive key trough 188, and boss aperture 190, which may be configured individually and relation to each other in the same manner as that discussed for the like-named components of rotor drive key 76 and rotor drive key 136. Central longitudinal axis L (perpendicular to the page) extends through boss aperture 190.

As illustrated at FIG. 8, first inner surface 192 of drive key body 178 defines a key protrusion 194 configured to insert into a boss recess 196 defined by wheel boss 171 as drive key body 178 translates over wheel boss 171 in an axial direction A1 of wheel 10. Key protrusion 194 may be configured to substantially conform to boss recess 196 in a plane substantially perpendicular to an axial direction A1 of wheel 10 (e.g., substantially parallel to a radial R1 and tangential T1 direction). A first section 198 of first inner surface 192 defines a third surface normal n3 (FIG. 8, inset 12) having a directional component parallel to the radial direction R1 of wheel 10 (e.g., parallel to the radial direction r−). First section 198 has a negative concavity with respect to third surface normal n3 (e.g., curves away from third surface normal n3).

Key protrusion 194 defines a profile in a plane perpendicular to longitudinal axis L configured to insert into boss recess 196. In some examples, the profile may include one or more curved segments, one or more linear segments, or may be include both curved and linear segments. When key protrusion 194 inserts into boss recess 196, third surface normal n3 intersects boss recess 196 such that drive key protrusion 194 substantially prevents relative motion of drive key body 178 in a radial direction R1 (e.g., in the radial direction r−). Key protrusion 194 is configured such that, when key protrusion 194 inserts into boss recess 196 and drive key body 178 experiences a force in the radial direction r−, boss recess 196 exerts a reaction force on key protrusion 194 in the radial direction r+ to maintain drive key body 178 in a substantially stationary radial position relative to wheel 10.

Key protrusion 194 may include a second section 202 defining a fourth surface normal n4 (FIG. 8, inset 12) having a directional component parallel to the radial direction R1 of wheel 10 (e.g., parallel to the radial direction r+). Second section 202 has a negative concavity with respect to fourth surface normal n4 (e.g., curves away from fourth surface normal n4). When key protrusion 194 inserts into boss recess 196, fourth surface normal n4 may intersect boss recess 196 such that, when drive key body 178 experiences a force in the radial direction r+, boss recess 196 exerts a reaction force on key protrusion 194 in the radial direction r−. The first section 198 and/or second section 202 may engage boss recess 196 to substantially trap drive key body 178 against movement in the radial direction R1, relative to wheel 10.

Key protrusion 194 extends over some length of drive key body 178 between a first body end (not shown) of drive key body 178 and a second body end (not shown) of drive key body 178 (e.g., extends over some segment of central longitudinal axis L). Key protrusion 194 may extend in a direction substantially perpendicular to central longitudinal axis L.

In some examples, key second side 184 of drive key body 178 includes second inner surface 204 facing first inner surface 192 of key first side 180. Second inner surface 204 defines key protrusion 206 configured to substantially conform with a boss recess 208 of wheel boss 171. For example, as illustrated at FIG. 8, second inner surface 204 may define key protrusion 206 configured to insert into boss recess 208 when drive key body 178 is translated over wheel boss 171 in an axial direction A1 of wheel 10. Boss recess 208 is displaced from the boss recess 196 in a tangential direction T1 of wheel 10 (e.g., on an opposite side of wheel boss 171 from boss protrusion 196). Key protrusion 206 may be configured with respect to second inner surface 204 in a manner similar to the configuration of key protrusion 194 with respect to first inner surface 192, and may be configured with respect to boss recess 208 in a manner similar to the configuration of first inner surface 192 with respect to boss recess 196.

Rotor drive keys 76, 136, 176 and fastener 108, as well as other components described herein, may be made from any suitable material. For example, the material may be any material of suitable strength for the intended use of rotor drive key 76, 136, 176 or fastener 108. In some examples, the material includes a metal or a metal alloy. For example, the material may include a nickel alloy or steel alloy. As one example, the material may include stainless steel.

In some examples, rotor drive keys 76, 136, 176 may be forged, casted, made from bar stock, additive manufactured (e.g., three-dimensionally (3D) printed), extruded, drawn, or be produced using other suitable methods. In some examples, rotor drive key 76, 136, 176 may be machined to obtain a rotor drive key 76, 136, 176 defining one or more of tab 80, tab aperture 110, key first side 96, key second side 102, and key base section 98. In other examples, rotor drive key 76, 136, 176 may formed without having to be substantially machined.

In some examples, fastener 108 may be forged, casted, made from bar stock, additive manufactured (e.g., 3D printed), or be produced using other suitable methods. In some examples, fastener 108 may be machined to obtain a fastener 108 defining one or more of bolt threads 126, fastener flange 123, fastener head 122, or other components of fastener 108. In other examples, fastener 108 may be formed without having to be substantially machined.

In some examples, wheel 10 may be finish machined from a near-net-shaped aluminum forging and contain wheel bosses for assembly of rotor drive key 76, 136, 176 onto wheel 10 using fastener 108 extending through, for example, wheel boss 71, 171 and tab 80. In other examples, wheel 10 may be manufactured in a different manner. In yet other examples, wheel 10 may be obtained rather than manufactured. In some examples, wheel 10 may be obtained and machined to form interior surface 14 including a plurality of wheel bosses. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Wheel 10 may comprise any number of wheel bosses and any number of rotor drive keys 76, 136, 176. Wheel bosses (including wheel bosses 71-74) protruding from interior surface 14 may extend in a substantially radial direction from adjacent portions of interior surface 14. A wheel boss may extend more radially inward than respective portions of interior surface 14 adjacent to the wheel boss. In some examples, wheel bosses may have any suitable height in the substantially radial direction. Moreover, a plurality of wheel bosses may comprise wheel bosses having the same height or substantially the same height, or comprise wheel bosses having different heights. Similarly, a plurality of wheel bosses may comprise wheel bosses having the same width or substantially the same width, or comprise wheel bosses having different widths. In some examples, wheel bosses may be present at substantially equal circumferential distances around interior surface 14 of wheel 10. In other examples, one or more of a plurality of wheel bosses may be present at different circumferential distances from an adjacent wheel boss. Additionally, wheel bosses may be any suitable distance from each other in the axial direction of wheel 10.

Figure 9:
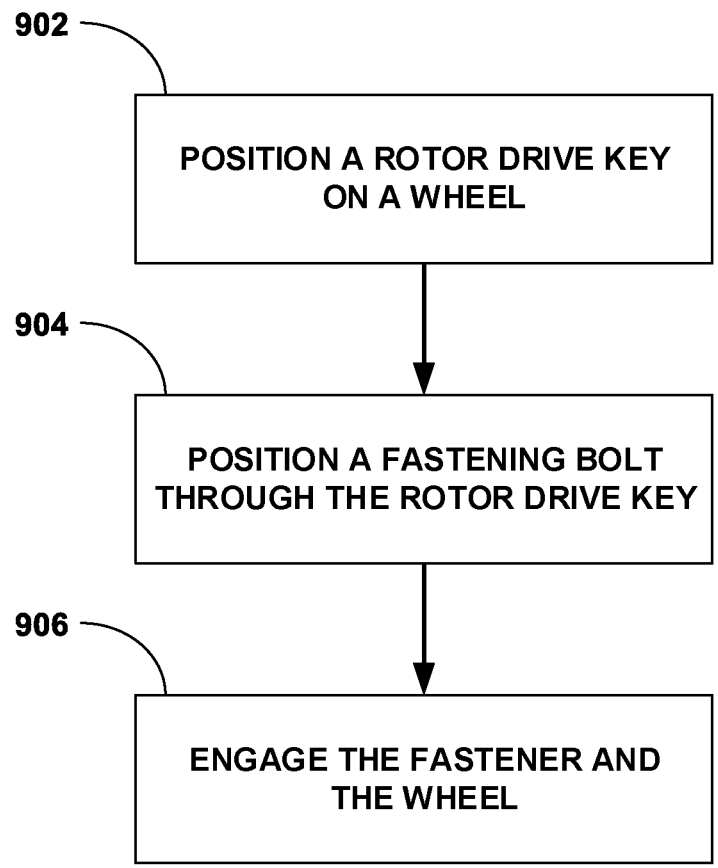
FIG. 9 is a flow diagram illustrating an example technique of attaching a rotor drive key to an interior surface of a wheel.

FIG. 9 is a flow diagram illustrating an example technique 900 of attaching a rotor drive key to an interior surface of a wheel. While the technique is described with reference to specific example rotor drive keys, fasteners, and wheel bosses described herein, the technique may be used with other examples components described herein. The technique 900 includes placing rotor drive key 76, 136, 176 having a conforming feature (e.g., drive key recess 94, 118 and/or key protrusion 194, 206) around some portion of wheel boss 71, 171 on interior surface 14 of wheel 10 (902). For example, an operator may introduce one or more wheel bosses 71, 171 in a drive key trough 82, 150, 188 defined by an inner surface 88, 152, 186 of drive key body 78, 138, 178 and translate the rotor drive key 76, 136, 176 over the wheel boss 71, 171 in an axial direction A1 of wheel 10. In some examples, as the rotor drive key 76, 136, 176 is translated over the wheel boss 71, 171, a boss protrusion 92, 120 defined by the respective wheel boss is received in the respective drive key recess 94, 118, and/or a key protrusion 194, 206 defined by the rotor drive key is received into a boss recess 196, 208 defined by the respective wheel boss.

In some examples, the operator can slide the rotor drive key 76, 136, 176 along the wheel boss 71, 171 until the respective tab 80, 106, 158 engages a bearing surface of the respective wheel boss 71, 171 or one or more materials between the tab and wheel boss 71, 171, such that the tab acts as a stop. In examples in which the tab 158 is separate from the drive key body 138 (FIG. 7), the operator can connect the tab 158 and the drive key body 138, such as by inserting tab protrusion 166 into tab recess 164 of drive key body 138.

After the rotor drive key 76, 136, 176 is positioned over the wheel boss 71, 171, such that the respective tab 80, 106, 158 engages a bearing surface of the respective wheel boss 71, 171 or is otherwise near the bearing surface, the operator can position fastener 108 through rotor drive key 76, 136, 176 (904). For example, the operator can extend fastener 108 through tab aperture 110, 162 of tab 80, 158 in an axial direction A1 of wheel 10 and into boss aperture 124, 190. In some examples, the user places a washer and/or gasket between fastener head 122 and tab 80, 158. The operator can engage a locking mechanism with fastener 108 (e.g., inserting a retainer through fastener head 122, placing a locking plate between fastener head 122 and tab 80, and the like) to fix the position of fastener 108 relative to the rotor drive key.

The operator can engage fastener 108 and wheel 10 (906). For example, the operator can threadably engage bolt threads 126 and boss threads 128 of wheel boss 71, 171. In some examples, the operator applies a torque to fastener head 122 to engage bolt threads 126 and boss threads 128. Torqueing fastener head 122 can compress some portion of tab 80, 158 (e.g., the portion surrounding tab aperture 110, 162) between fastener head 122 and wheel boss 71, 171.

Although FIG. 9 is described with reference to a technique performed by an operator, in some examples, all or part of the technique shown in FIG. 9 can be automatically performed by a machine.

Various examples have been described. These and other examples are within the scope of the following claims.

What is claimed is:

1. A rotor drive key comprising:
a drive key body configured to be positioned between a wheel boss of a wheel and an axis of the wheel, wherein the drive key body defines a trough configured to receive the wheel boss of the wheel, wherein the trough is defined at least in part by an inner surface of the drive key body, wherein the inner surface is configured to conform with a portion of an outer profile of the wheel boss when the trough receives the wheel boss, and wherein the inner surface of the drive key body is configured to limit movement of the drive key body in a radial direction toward the axis of the wheel when the inner surface conforms with the portion of the outer profile; and a tab configured to extend from the drive key body, wherein the tab defines a tab aperture, the tab aperture extending through the tab in an axial direction of the wheel when the wheel boss is received in the trough.

2. The rotor drive key of claim 1, wherein the inner surface of the drive key body is configured to limit movement of the drive key body in the radial direction toward the axis of the wheel when the wheel boss is received in the trough.

3. The rotor drive key of claim 1, wherein the tab is configured to limit movement of the drive key body in the axial direction of the wheel when the wheel boss is received in the trough and the tab is connected to the drive key body.

4. The rotor drive key of claim 1, wherein the inner surface of the drive key body is configured to enable sliding translation between the drive key body and the wheel boss in the axial direction of the wheel.

5. The rotor drive key of claim 4, wherein the inner surface defines a recess, a protrusion, or a recess and a protrusion configured to conform with the portion of the outer profile of the wheel boss when the trough receives the wheel boss.

6. The rotor drive key of claim 1, wherein the drive key body comprises a key base section, a key first side, and a key second side defining a substantially U-shaped cross-section, wherein the inner surface comprises one or more of the key first side or the key second side.

7. The rotor drive key of claim 6, wherein the inner surface of the drive key body is a first inner surface, and wherein the key first side is defined by the first inner surface and the key second side is defined by a second inner surface of the drive key body, wherein the second inner surface is configured to conform with another portion of the outer profile of the wheel boss when the drive key body receives the wheel boss.

8. The rotor drive key of claim 7, wherein the first inner surface faces the second inner surface.

9. The rotor drive key of claim 6, wherein a portion of the inner surface defines a positive concavity or a negative concavity with respect to a vector normal to the inner surface and extending from the portion of the inner surface and towards an axis extending between the key first side and the key second side.

10. The rotor drive key of claim 1, further comprising a fastener configured to extend through the tab aperture and into the wheel boss.

11. The rotor drive key of claim 10, wherein the fastener is configured to threadably engage the wheel boss when the fastener extends through the tab aperture.

12. The rotor drive key of claim 1, wherein the tab is separable from the drive key body, wherein the tab defines a tab protrusion, and wherein the drive key body defines a supporting recess configured to receive the tab key.

13. The rotor drive key of claim 1, wherein the tab and the drive key body have a unibody construction.

14. An assembly comprising:

a wheel comprising a wheel boss, wherein the wheel boss defines an outer profile protruding in a tangential direction of the wheel; and a rotor drive key defining a trough configured to receive the wheel boss, the trough being defined at least in part by an inner surface of the rotor drive key, and the rotor drive key being configured to be positioned between the wheel boss and an axis of the wheel when the wheel boss is received in the trough, wherein the inner surface is configured to establish a conforming contact with some portion of the outer profile of the wheel boss when the wheel boss is received in the trough, and wherein the inner surface is configured to limit movement of the rotor drive key in a radial direction toward the axis of the wheel when the inner surface establishes the conforming contact.

15. The assembly of claim 14, wherein the inner surface is configured to provide a dovetail with the wheel boss when the wheel boss is received in the trough, wherein the dovetail is configured to enable sliding translation between the rotor drive key and the wheel boss in a substantially axial direction of the wheel.

16. The assembly of claim 14, wherein the rotor drive key and the wheel boss are configured to receive a fastener in a substantially axial direction of the wheel when the rotor drive key is positioned around the wheel boss.

17. The assembly of claim 14, wherein the wheel comprises a plurality of wheel bosses, the plurality including the wheel boss, wherein each wheel boss of the plurality defines a respective outer profile protruding in the tangential direction of the wheel, and wherein the inner surface of the rotor drive key is configured to simultaneously establish the conforming contact with some portion of the outer profile of each wheel boss of the plurality of wheel bosses.

18. The assembly of claim 14, wherein the rotor drive key comprises a key base section, a first side section, and a second side section defining the trough, the trough having a substantially U-shaped cross-section, wherein the inner surface of the drive key body comprises one or more of the first side section, the second side section, or the key base section.

19. A method comprising:

positioning a rotor drive key defining a trough around a wheel boss of a wheel, wherein the trough is defined at least in part by an inner surface of the rotor drive key, wherein the inner surface is configured to conform with a portion of an outer profile of the wheel boss, wherein positioning the rotor drive key around the wheel boss comprises slidably translating the rotor drive key in an axial direction of the wheel to position the rotor drive key between the wheel boss and an axis of the wheel, and wherein the inner surface is configured to limit movement of the rotor drive key in a radial direction toward the axis of the wheel when the inner surface conforms with the portion of the outer profile; and extending a fastener through the rotor drive key and into the wheel boss in an axial direction of the wheel.

20. The method of claim 19, further comprising contacting an outer profile of the wheel boss protruding in a tangential direction of the wheel with an inner surface of the drive key body having a concavity toward the wheel boss.

* * * * *